Sept. 30, 1941.    H. W. ALBRECHT    2,257,663
APPARATUS FOR PRODUCING INTERRUPTED ALTERNATING CURRENT
Filed June 1, 1939

INVENTOR
*H. W. Albrecht*
BY
*William R. Bricard*
ATTORNEY

Patented Sept. 30, 1941

2,257,663

UNITED STATES PATENT OFFICE 2,257,663

APPARATUS FOR PRODUCING INTERRUPTED ALTERNATING CURRENT

Harold Willius Albrecht, St. Paul, Minn., assignor to American Telephone and Telegraph Company, a corporation of New York Application June 1, 1939, Serial No. 276,929

9 Claims. (Cl. 250—36)

This invention relates to oscillation generators. This invention also relates to arrangements for interrupting the oscillations produced by oscillation generators at regular intervals. This invention further relates to gas tube circuits as well as to arrangements for utilizing the features of gas tube circuits for interrupting or controlling the flow of current of oscillation generators or other devices.

Figure 1:
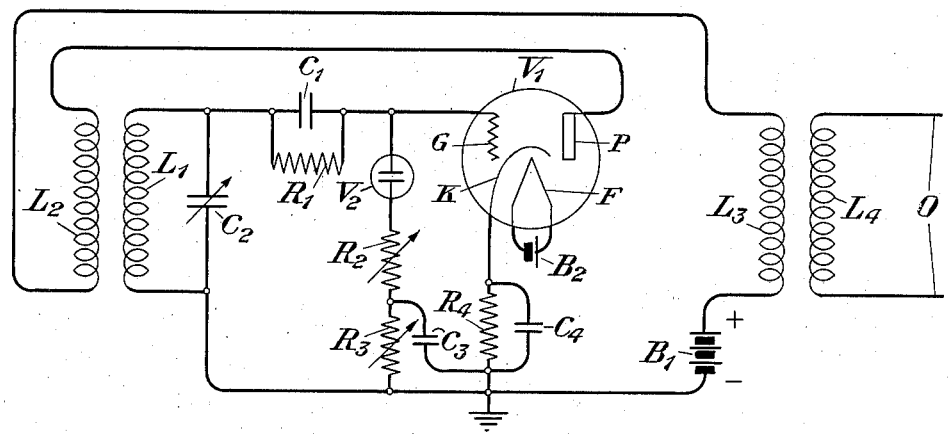
Figure 2:
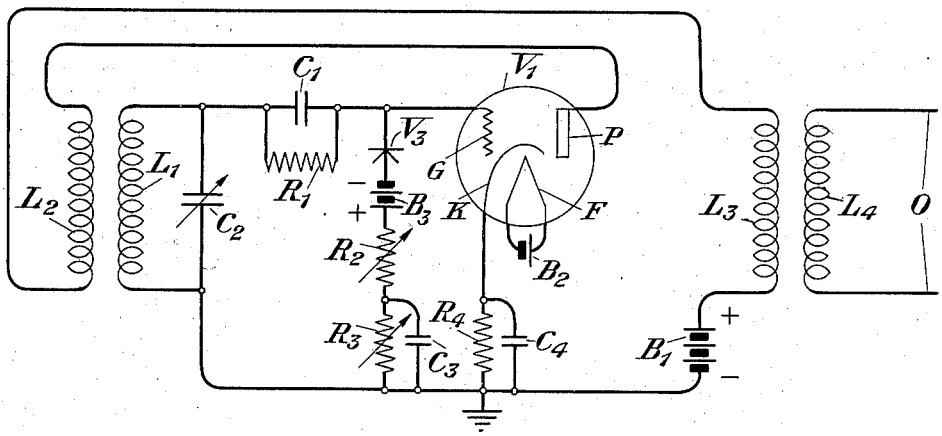

This invention will be better understood from the detailed description hereinafter following when read in connection with the accompanying drawing in which Figure 1 shows one embodiment of the invention employing a gas tube circuit to control the generation and interruption of oscillations of a vacuum tube oscillation generator and Fig. 2 illustrates a modification of the arrangement of Fig. 1 in which a rectifier circuit has been used in place of the gas tube circuit.

Referring to Fig. 1 of the drawing, the reference character $V_1$ designates a vacuum tube comprising a grid G, a plate P, a cathode K and a filament or heater F. The grid G is connected to ground through a circuit comprising a grid condenser $C_1$ and leak resistor $R_1$ connected in parallel relationship and a coil $L_1$ which may be one of the windings of a transformer. The coil $L_1$ is shunted by a condenser $C_2$ the capacity of which may be varied for tuning purposes. The cathode K is connected to ground through a resistor $R_4$ and condenser $C_4$ which are arranged in parallel relationship. The circuit between the plate P and cathode K comprises the winding $L_2$ of the transformer already referred to, the primary winding $L_3$ of another transformer, a battery $B_1$ and the parallel-connected resistor $R_4$ and condenser $C_4$. A battery $B_2$ may be used to supply current to heat the filament or heater F of the tube $V_1$ to incandescence. The grid G is also connected to ground through a circuit comprising a gas-filled tube $V_2$ of the two-electrode type and two resistors $R_2$ and $R_3$ which may be variable as shown. A condenser $C_3$ is connected between the terminal common to the resistors $R_2$ and $R_3$ and ground. The secondary winding $L_4$ may be connected to an output circuit O to which the current produced by the system may be transmitted.

It will be observed that without the gas tube $V_2$, resistors $R_2$ and $R_3$ and the condenser $C_3$, the circuit comprises an oscillation generator of well known type. In this circuit the coils $L_1$ and $L_2$, which are respectively in the grid and plate circuits of the tube $V_1$, are coupled to each other so as to feed current in the plate circuit back to the grid circuit for the production of oscillations. These oscillations may be of any desired frequency, the frequency being determined by the adjustment of the condenser $C_2$ and by the proportions of the other elements of the circuit.

In the oscillation generator just referred to the grid condenser $C_1$ and resistor $R_1$ are employed to regulate the leakage of negative charge from the grid G of the tube $V_1$ to ground, the grid being biased to a negative potential with respect to the cathode K. It will be further noted that the flow of current from the battery $B_1$ over coils $L_3$ and $L_2$ and through the space between the plate P and cathode K of tube $V_1$ and through resistor $R_4$ causes a voltage to be produced across the terminals of the resistor $R_4$ (and of course across the condenser $C_4$) and this voltage furnishes part of the negative biasing potential for the grid electrode G of the tube $V_1$.

In the grid leak type of oscillation generator just described the values of condenser $C_1$ and resistor $R_1$ may be so proportioned that interruptions of the oscillations may be obtained. However, changing these proportions in order to adjust the frequency of the interruptions changes the length of both the "on" and "off" periods. The addition of the gas tube $V_2$, the resistors $R_2$ and $R_3$ and the condenser $C_3$ makes it possible to adjust the length of the "on" period so that control of the relative lengths of the "on" and "off" periods as well as control of the total period of the operating cycle is possible. The manner in which this circuit functions will be described hereinafter.

Two voltages are simultaneously impressed between the grid electrode G and the cathode K of the tube $V_1$. One of these voltages is the alternating voltage fed from the plate circuit of the tube $V_1$ to its grid circuit through the coils $L_2$ and $L_1$. The other of these voltages is a unidirectional voltage which is impressed across the grid condenser $C_1$ and the leak resistor $R_1$, the latter voltage being always negative at the grid G when considered with respect to the cathode K. These two voltages may be treated independently of the voltage across resistor $R_4$, which is relatively small as compared with the other two. The unidirectional voltage across condenser $C_1$ and the alternating voltage together form a wave which for only a small portion of each cycle—considerably less than half of the cycle—will apply a positive voltage to the grid G with respect to the cathode K, this voltage being of opposite polarity during the remainder of the cycle, Before considering the manner in which the grid condenser and leak resistor and the gas tube circuit above referred to act to interrupt the generated alternating current, it may be well to keep in mind the inherent properties of a gas tube such as $V_2$ of the type here involved. The tube $V_2$ is of well known type and comprises two electrodes which are immersed in a gaseous medium of low pressure. When the voltage between the two electrodes of the tube $V_2$ exceeds a predetermined value, the gas within the tube will become ionized and an arc will be formed between these electrodes. The voltage at which the arc is formed is commonly referred to as the breakdown voltage. After the arc has formed, the arc will be maintained as long as the voltage between the electrodes of the gas tube remains higher than a lower predetermined value. The voltage at which the arc may be maintained after it has been initiated is commonly known as the sustaining voltage. As the voltage between the two electrodes is reduced below this latter voltage, namely the sustaining voltage, the arc will be extinguished and the gas within the tube will become deionized. The tube $V_2$ will operate substantially equally well regardless of the polarity of the applied voltage.

The composite alternating and direct voltage between the grid G and the cathode K of the tube $V_1$, i. e., the alternating voltage fed back to the grid circuit of the tube and the one appearing across the condenser $C_1$, may be divided, for the purpose of explaining the action of the system, into four parts. One part is that small portion of each cycle during which the grid G is charged to a positive potential with respect to the cathode K. The second part is the succeeding portion of each cycle when the grid voltage rises from a zero or negligible value to a substantially high negative voltage, the magnitude of which is equal to or greater than that required to ionize the gas within the tube $V_2$ and establish an arc between its electrodes. The third part of each cycle may be considered as that portion of the cycle after the gas within the gas tube $V_2$ has become ionized and an arc is established between the electrodes of the tube $V_2$ and including the interval when the arc is maintained between the electrodes of the tube. The fourth and last part of each cycle begins with a negative voltage applied to the grid which is substantially equal to or less than the sustaining voltage of the tube $V_2$ and extending to the beginning of that portion of the cycle at which a positive voltage is again applied between the grid electrode G and the cathode of tube $V_1$.

During the first short interval, i. e., when a positive voltage is applied to the grid G, current will actually flow in the circuit including the tube $V_1$ (grid G to cathode K), the circuit including the resistor $R_4$ with its parallel connected condenser $C_4$, the coil $L_1$ with its parallel connected condenser $C_2$ and the resistor $R_1$ with its parallel connected condenser $C_1$. The flow of current through the resistor $R_1$ will be in such a direction as to charge the condenser $C_1$, the direction of the charge being such that the right-hand terminal of the condenser will become negative with respect to its left-hand terminal.

During the second part of the cycle, i. e., when the voltage applied to the grid G becomes increasingly negative up to a point immediately before the gas tube $V_2$ becomes operated, the condenser $C_1$ will discharge the voltage impressed upon its terminals. This discharge will occur through the resistor $R_1$, the resistor $R_1$ being so large that the discharge rate of the condenser $C_1$ will be comparatively slow. While the condenser $C_1$ discharges, however, the negative voltage applied to the grid by the composite voltage will nevertheless increase and will thereafter reach a value sufficient to ionize the gas of tube $V_2$. When this voltage is reached, an arc will be established between the electrodes of tube $V_2$.

During the third part of the cycle, i. e., the interval during which the tube $V_2$ is in an ionized condition, the condenser $C_1$ will discharge through two parallel paths, one of which comprises the resistor $R_1$, the other discharge path being formed by the coil $L_1$ with its parallel connected condenser $C_2$, the resistor $R_3$ with its parallel connected condenser $C_3$, the resistor $R_2$ and the tube $V_2$. This portion of the cycle will terminate when the voltage across the electrodes of tube $V_2$ is reduced below the value required to maintain gaseous ionization within the tube $V_2$ and, therefore, the arc will become extinguished.

During the fourth and last part of the cycle the voltage applied to the grid G will become less and less negative with respect to the cathode K. During this last part of the cycle, the condenser $C_1$ will continue to discharge through the resistor $R_1$. The cycle will be completed when the composite voltage applied between the grid G and the cathode K again renders the grid electrode G positive with respect to the cathode K.

The constants of the elements entering into the circuit are such that the voltage impressed upon the condenser $C_1$ at the end of each cycle is substantially greater than the voltage impressed upon the condenser at the beginning of the cycle. Thus during each cycle the voltage across the condenser $C_1$ will be raised, the right-hand terminal of condenser $C_1$ becoming more negative than its left-hand terminal. Hence the voltage applied to the grid G will become increasingly negative until this negative voltage has reached a value which is so large as to completely block the flow of current in the plate circuit of the tube $V_1$. When this occurs no current will flow in the plate circuit of tube $V_1$ and no oscillations will be generated by the system. Therefore no current will be transmitted through the windings $L_3$ and $L_4$ to the output circuit O. During this period, moreover, the gas within the tube $V_2$ will remain deionized and there will be no arc between its electrodes.

While the generation of alternating current by the oscillation generator remains interrupted, the condenser $C_1$ will discharge through the resistor $R_1$. The discharge through resistor $R_1$ will continually reduce the negative voltage applied to the grid G. When this negative voltage has become sufficiently reduced, current will again flow through the plate circuit of the tube $V_1$ and an alternating voltage will be again generated and transmitted through the coils $L_2$ and $L_1$ and through the condenser $C_1$ to the grid G and cathode K of the tube $V_1$ as heretofore. Oscillations will be again supplied to the output circuit O. This cycle will be repeated and current of a predetermined frequency will be produced for a fixed interval, then interrupted for another fixed interval, and then reestablished for another interval, and so on.

In the circuit of Fig. 1, the average grid potential is driven beyond the cutoff point of the tube $V_1$ soon after oscillation starts. Oscillation continues, however, even under these conditions due primarily to the extremely close feedback coupling between the plate and grid circuits of tube $V_1$. Eventually a grid bias of sufficiently high negative value is reached which causes the oscillations to cease. The oscillations cease and the system remains non-oscillatory because the gain of the amplifier is below the associated circuit losses.

It will be noted that the resistor $R_2$ primarily controls the maximum current which will be transmitted through the gas tube $V_2$. As the resistor $R_2$ is increased in magnitude the flow of current through the tube $V_2$ will become reduced.

The resistor $R_3$ primarily controls the minimum flow of current through the gas tube $V_2$. As the magnitude of the resistor $R_3$ is increased the minimum current flow through the tube $V_2$ will be decreased, and as resistor $R_3$ is made larger and larger the minimum current will approach a zero or negligible value. In most applications, the resistor $R_3$ will be substantially larger than resistor $R_2$.

It will be observed that the voltage impressed across the condenser $C_1$ is in turn applied between the grid G and cathode K. The voltage between grid G and cathode K will periodically rise above that required to ionize the gas of tube $V_2$ and then drop below that required to maintain the latter tube in an ionized condition. When the voltage between the grid G and cathode K exceeds the breakdown voltage value for the tube $V_2$, the ensuing flow of current through the tube $V_2$ will cause the condenser $C_3$ to be charged through the circuit of the resistors $R_2$ and $R_1$. Inasmuch as the grid G is always biased to a negative potential with respect to the cathode K, the left-hand terminal of the condenser $C_3$ will always be at a negative potential with respect to its right-hand terminal. The condenser $C_3$ wil be continually charged to an increasing potential as long as the gas of tube $V_2$ remains ionized. After the tube $V_2$ becomes deionized, however, the voltage impressed upon condenser $C_3$ will be discharged through the resistor $R_3$ which is bridged across it. The condenser $C_3$ is charged by the voltage across condenser $C_1$ as well as that across the coil $L_1$, but condenser $C_3$ can become charged only when the gas within tube $V_2$ has become ionized.

The means for controlling the interval during which oscillations are produced by the vacuum tube system is in general substantially independent of the means to control the period during which oscillations cease. The resistor $R_1$ and its shunting condenser $C_1$ primarily control the period during which oscillations cease. As the resistor $R_1$, for example, is made larger and larger the interval during which no current will be produced will be made larger and larger. This is because the voltage impressed upon the condenser $C_1$ will then leak off more slowly. On the other hand, the interval during which oscillations are produced will be controlled primarily by the circuit comprising the tube $V_2$, the resistors $R_2$ and $R_3$ and the condenser $C_3$. As the magnitudes of the resistors $R_2$ and $R_3$, for example, are made smaller and smaller, alternating current will be generated for longer and longer intervals. This is because the voltage impressed upon the condenser $C_1$ will, with smaller resistors for $R_2$ and $R_3$, leak off at a faster rate and hence a longer interval will be required to raise the voltage applied to grid G to a value sufficient to block the flow of plate current.

The circuit shown in the drawing may be adjusted for the production of alternating current of any frequency as for example, current of low frequencies such as 20 cycles or 60 cycles, or current of higher frequencies of many kilocycles. Each such current will be interrupted periodically and the interruptions may be varied over as wide a range as desired. The interrupted current produced by the system may be utilized for the production of ringing currents and busy tones in connection with telephone apparatus.

When current is being generated by the vacuum tube oscillator, the tube $V_2$ will flash several times as the breakdown voltage of the tube is reached at different times. These flashes will be visible to the operator. In general, they may be used to measure the interval during which current is produced by the system. The absence of such flashes will correspond approximately with the interval when no current is being produced by the system.

In order to obtain a finite non-oscillatory period, the grid voltage at which oscillation ceases must be appreciably more negative than the grid voltage at which oscillation again begins. This requirement is met by the proper adjustment of the circuit elements of the system disclosed here. If this requirement were not met, the time required for the grid voltage to change from the "non-oscillating" condition to the "oscillating" condition would be infinitesimal and the non-oscillating condition would accordingly also be infinitesimally short.

Fig. 2 illustrates a modification of the arrangement of Fig. 1 in which a rectifier $V_3$ and a biasing battery $B_3$ have been substituted for the gas tube $V_2$ of Fig. 1. The rectifier $V_3$ may be of the copper oxide type or, if desired, of any vacuum tube type. The rectifier $V_3$ and biasing battery $B_3$ have been poled so that no current will normally flow from the battery $B_3$ through the rectifier $V_3$ to charge the condensers $C_1$ or $C_3$. The rectifier $V_3$ will, however, pass current when the composite voltage is of the proper polarity and of sufficient magnitude, as already described with respect to Fig. 1. The magnitudes of resistors $R_2$ and $R_3$ will, as in the case of Fig. 1, control the rate at which condenser $C_1$ will discharge. Moreover, this discharge will in general occur whenever the composite voltage wave exceeds the voltage of the biasing battery $B_3$.

The rectifier $V_3$, therefore, provides a discharge path for condenser $C_1$ whenever oscillations are being generated by the vacuum tube system. Nevertheless this discharge path will be ineffective during the idle period when no oscillations are being generated.

The condenser $C_3$ is not absolutely essential to the operation of the circuits of Figs. 1 and 2. If the resistors $R_2$ and $R_3$ are properly adjusted, this condenser may be eliminated.

The oscillation generator of Figs. 1 and 2 may also include any well-known means for controlling the frequency of the current generated thereby as, for example, a tuning fork. Such a fork may be positioned between the coils $L_1$ and $L_2$, the coil $L_2$ being used for driving the fork and the coil $L_1$ for picking up a voltage of a frequency corresponding to the period of the fork, or one of its harmonics, and applying that voltage between the grid G and cathode K of the tube $V_1$.

The oscillation generator has been shown as comprising the magnetically coupled coils $L_1$ and $L_2$ for the generation of oscillations merely for the purpose of illustration. It will be understood that vacuum tube oscillators of other types, such as the Hartley or Colpitts oscillators, may be substituted therefor.

While this invention has been shown in certain particular arrangements merely for the purpose of illustration, it will be understood that the general principles of this invention may be applied to other and widely varied organizations without departing from the spirit of the invention and the scope of the appended claims.

What is claimed is:

1. The combination of a vacuum tube oscillator, the plate and cathode of the vacuum tube of said oscillator being in a circuit which is coupled to the circuit of the grid and cathode to feed voltages back to the latter circuit to generate oscillations, a condenser, a leak resistor connected in parallel with said condenser between the grid and cathode of the vacuum tube of said oscillator, means for charging said condenser, means for delaying the charge of said condenser, said delaying means comprising a gas tube circuit connected effectively in parallel with said condenser, the operation of said gas tube circuit being controlled by the magnitude of the charge on said condenser, and means responsive to a predetermined charge on said condenser for interrupting the generation of oscillations by said oscillator for a substantial time interval.

2. Apparatus for producing interrupted alternating current comprising a vacuum tube arrangement including plate, grid and cathode electrodes set up for feeding energy in the plate-cathode circuit back to the grid-cathode circuit to generate oscillations, a condenser and resistor connected in parallel with each other and connected between the grid and cathode electrodes of said tube, a gas tube circuit also connected between the grid and cathode electrodes of said tube for controlling the rate of charge of said condenser, said gas tube being operated when the charge on said condenser exceeds a first predetermined value, and means responsive to a charge on said condenser exceeding a second predetermined value for periodically interrupting the oscillations generated by said vacuum tube arrangement for a predetermined interval.

3. Apparatus for producing interrupted alternating current without any moving parts whatever, comprising an oscillator including a vacuum tube having plate, grid and cathode electrodes, the plate-cathode circuit of said tube being coupled to its grid-cathode circuit for generating oscillations, a condenser and leak resistor in parallel relationship with each other and connected in said grid-cathode circuit, a gas tube circuit also connected in said grid-cathode circuit, said gas tube circuit being operated when the charge on said condenser exceeds a predetermined value, the constants of said condenser and leak resistor being proportioned to fix the interval during which the oscillations produced by said oscillator are interrupted, the constants of the gas tube circuit being proportioned to fix the interval during which oscillations are generated by said oscillator.

4. The method of producing interrupted alternating current with apparatus including a condenser and a gas tube circuit, which consists in generating alternating current, rectifying a predetermined portion of the current during each cycle, periodically discharging some of the rectified current through said gas tube circuit, building up a voltage on said condenser from the remainder of the rectified current step-by-step, and interrupting the alternating current as the built-up voltage exceeds a predetermined value.

5. The method of producing alternating current with an oscillation generator having a grid condenser and leak resistor and a gas tube circuit, which consists in operating said oscillation generator so as to obtain alternating current, rectifying a portion of said current during each cycle thereof, charging said condenser and elevating the voltage on said condenser by an increment of voltage during each succeeding cycle, delaying the charge of said condenser by discharging a portion of its voltage through the gas tube circuit, the charge upon the condenser being increased after each cycle, interrupting the production of alternating current in response to a predetermined voltage across said condenser, and discharging said condenser through said resistor.

6. The combination of a vacuum tube oscillation generator including a vacuum tube having grid, plate and cathode electrodes, the grid-cathode circuit being coupled to the plate-cathode circuit so that voltages may be fed back from the plate-cathode circuit to the grid-cathode circuit to generate oscillations, a grid condenser and leak resistor connected in parallel with each other in the grid-cathode circuit of said tube, the condenser being periodically charged by the voltages present in the grid-cathode circuit of said tube, and a gas tube circuit connected also in the grid-cathode circuit of the tube to delay the charge of said condenser, said gas tube circuit being operated when the charge on said condenser exceeds a predetermined value.

7. The combination of a vacuum tube including plate, grid and cathode electrodes, a condenser and a resistor connected in parallel relationship to each other and connected between the grid and cathode electrodes, a feedback circuit interconnecting the plate and grid electrodes of said tube in order that the tube may generate oscillations, the condenser and resistor being proportioned so as to periodically interrupt the generation of oscillations, and a gas tube circuit also connected between the grid and cathode electrodes to delay the charge of said condenser.

8. The combination of a vacuum tube oscillation generator having a condenser connected to the grid and filament electrodes of the vacuum tube thereof, the plate and filament electrodes of the tube forming a circuit which is coupled to the circuit of the grid and filament electrodes for the generation of oscillations, a gas-filled tube circuit connected effectively in parallel to said condenser, means for applying voltage to said condenser, means for varying the voltage applied to said condenser between values which exceed the voltage required to establish an arc between the electrodes of said gas tube and another voltage which is less than that required to sustain said arc, and means including a resistor for limiting the flow of current through said gas tube.

9. The combination of an oscillation generator including a vacuum tube having a circuit connected to its grid and filament electrodes and a circuit connected to its plate and filament electrodes which is coupled to the first-mentioned circuit to feed voltages back to said first-mentioned circuit to generate oscillations, means for interrupting the generation of oscillations by said oscillation generator, said interrupting means including a condenser connected to the grid and filament electrodes of the vacuum tube of said oscillation generator, and means for fixing the interval during which oscillations are produced by said oscillation generator, said latter means comprising a gas tube circuit connected effectively in parallel to said condenser, said gas tube circuit being operated when the charge on said condenser exceeds a predetermined value.

HAROLD WILLIUS ALBRECHT.